United States Patent [19]
McKedy

[11] Patent Number: 6,156,231
[45] Date of Patent: Dec. 5, 2000

[54] OXYGEN ABSORBING COMPOSITION WITH COVER LAYER

[75] Inventor: George E. McKedy, Williamsville, N.Y.

[73] Assignee: Multisorb Technologies, Inc., Buffalo, N.Y.

[21] Appl. No.: 09/008,031

[22] Filed: Jan. 16, 1998

Related U.S. Application Data

[60] Continuation-in-part of application No. 08/664,160, Jun. 14, 1996, Pat. No. 5,746,937, which is a division of application No. 08/303,171, Sep. 8, 1994, Pat. No. 5,641,425.

[51] Int. Cl.$^7$ ................. C01B 3/00; B32B 7/12; B32B 3/26
[52] U.S. Cl. ................. 252/188.28; 428/321.1; 428/343
[58] Field of Search ............. 252/188.28, 310, 252/315.1, 315.2, 324; 428/35.3, 35.5, 36.4, 320, 321.1, 321.5, 343

[56] References Cited

U.S. PATENT DOCUMENTS

| | | |
|---|---|---|
| 2,902,446 | 1/1959 | Mitchell et al. . |
| 3,974,116 | 8/1976 | Lissant . |
| 4,287,995 | 9/1981 | Moriya . |
| 4,421,235 | 12/1983 | Moriya . |
| 4,485,133 | 11/1984 | Ohtsuka et al. . |
| 4,487,791 | 12/1984 | Komatsu et al. . |
| 4,510,274 | 4/1985 | Okazaki et al. . |
| 4,579,223 | 4/1986 | Otsuka et al. . |
| 4,606,913 | 8/1986 | Aronson et al. . |
| 4,617,239 | 10/1986 | Maruyama et al. . |
| 4,740,402 | 4/1988 | Maeda et al. . |
| 4,756,436 | 7/1988 | Morita et al. . |
| 4,769,175 | 9/1988 | Inoue . |
| 4,840,280 | 6/1989 | Schvester . |
| 4,856,650 | 8/1989 | Inoue . |
| 4,871,654 | 10/1989 | Vanmaele et al. . |
| 5,019,212 | 5/1991 | Morita et al. . |
| 5,089,323 | 2/1992 | Nakae et al. . |
| 5,143,763 | 9/1992 | Yamada et al. . |
| 5,143,769 | 9/1992 | Moriya et al. . |
| 5,236,469 | 8/1993 | Carlson et al. . |
| 5,239,016 | 8/1993 | Cochran et al. . |
| 5,254,354 | 10/1993 | Stewart . |
| 5,270,337 | 12/1993 | Graf . |
| 5,352,503 | 10/1994 | Drake et al. . |
| 5,364,555 | 11/1994 | Zenner et al. . |
| 5,381,914 | 1/1995 | Koyama et al. . |

FOREIGN PATENT DOCUMENTS

| | | |
|---|---|---|
| 0402217A1 | 12/1990 | European Pat. Off. . |
| 0546903A1 | 6/1993 | European Pat. Off. . |
| 54-46186 | 4/1979 | Japan . |
| 63-135483 | 6/1988 | Japan . |
| 4-90848 | 3/1992 | Japan . |
| 5-97163 | 4/1993 | Japan . |
| 62111676 | 5/1997 | Japan . |
| WO92/12004 | 7/1992 | WIPO . |
| WO 96/07711 | 3/1996 | WIPO . |

OTHER PUBLICATIONS

PCT Search Report dated Dec. 26, 1995.
Supplementary European search report relating to EP 95 93 1656 dated Jun. 20, 1997.
Written Opinion dated Aug. 8, 1996 corresponding to International Application No. PCT/US95/11064.

Primary Examiner—Yogendra Gupta
Assistant Examiner—John M Petruncio
Attorney, Agent, or Firm—Ratner & Prestia

[57] ABSTRACT

An oxygen absorbing composition having an effective amount of at least one oxygen absorbent contained in an emulsion. An oxygen absorbing product is produced by dispersing an oxygen absorbent in an emulsion, dispersion, or suspension to form an oxygen absorbing composition and transferring the oxygen absorbing composition onto a substrate. A cover layer is disposed over the oxygen absorbing composition.

3 Claims, 2 Drawing Sheets

OXYGEN ABSORBING COMPOSITION WITH COVER LAYER

This application is a continuation-in-part of allowed application Ser. No. 08/664,160, filed Jun. 14, 1996, now U.S. Pat. No. 5,746,937 which in turn is a divisional application of Ser. No. 08/303,171, filed Sep. 8, 1994, now U.S. Pat. No. 5,641,425.

FIELD OF THE INVENTION

This invention relates in general to oxygen-absorbing compositions and in particular to oxygen-absorbing compositions having an oxygen absorbent dispersed in an emulsion that may be printed or coated onto a substrate and covered with a thin polymer coating. The composition is used to remove oxygen from a container, thus increasing the preservation stability within the container of a foodstuff, beverage, pharmaceutical, chemical, or other substance that can be adversely affected by the presence of oxygen.

BACKGROUND OF THE INVENTION

Many products are susceptible to putrefaction, denaturation, mold growth, spoilage, rancidity, oxidation, or other deterioration when brought into contact with oxygen. Examples of such products include beer, wine, juice, vinegar, sauces, seasonings, processed foods, bread, produce, meats, and certain pharmaceuticals and chemicals, among a variety of others. Preservation of such products is disturbed when molds, bacteria, and other organisms that thrive in the presence of oxygen are present. These organisms cause the putrefaction and change in the taste or quality of the product. In addition, some of the products themselves are liable to be affected by oxidation that changes the taste or quality of the product. To prevent such oxidation and growth of organisms and thus increase the preservation stability of these products, the oxygen must be removed from the container in which the products are stored.

One technique for avoiding or reducing the presence of oxygen is vacuum packing. This involves evacuating a container after charging it with the product.

Another technique is gas flushing or displacement. Here, an inert gas such as nitrogen is used to displace the air and hence the oxygen in a container. The displacement can be performed before or after the product is charged to the container.

Still another technique is a foaming method. Particularly applicable to products such as beer, a jet foamer can be used to inject a small amount of pressurized water to foam the beer after charging it to the container. The foam acts as a mechanical deoxygenizer.

Common disadvantages associated with all of the above techniques are the requirement of large-scale apparatus and operation and the difficulty of removing oxygen dissolved in the product. Also, in general, these techniques leave between 0.2% and 5.0% of the oxygen in the container. This amount of oxygen in the container is enough to adversely affect many products.

A simpler, more efficient technique for oxygen removal involves placing an oxygen absorbent in the container with the product. For this purpose, it is known to dispose an oxygen absorbent within a resin that is solid at room temperature. For example, in U.S. Pat. No. 5,143,763, compositions are disclosed having an oxygen absorbent disposed in a resin such as polyethylene, polypropylene, and ethylene-vinyl acetate copolymer, among others. U.S. Pat. No. 5,089,323 discloses compositions having an oxygen absorbent contained in thermoplastic resins such as low-density branched polyethylene, high-density polyethylene, propylene homopolymers, and copolymers of ethylene and vinyl acetate, among others.

Because the resins in these examples are solids at room temperature, application of the resin-oxygen absorbent mixture is often difficult. Accordingly, the '763 reference suggests dissolving the resin in a solvent to form a resin solution to facilitate application of the mixture. Specifically, the processes of forming a solution having an oxygen absorbent in it and applying it by screen printing are disclosed in the '763 reference.

Several limitations are inherent, however, in the process of applying a solution by screen printing. In order to print the solution, the screen must be pressed against the substrate upon which the solution is to be printed. When the screen is lifted to move to another print location on the substrate, the surface tension and viscosity characteristics of a solution are such that there is not a clean, complete separation between the solution that has been printed on the substrate and the solution remaining on or behind the screen. This results in a poor quality print that is difficult to control.

Known oxygen absorbing formulations have other limitations: they can contain only a limited amount of oxygen absorbent, they have limited oxygen permeability, and they are only effective to absorb oxygen in high humidity environments.

SUMMARY OF THE INVENTION

The present invention provides an oxygen absorbing composition having an effective amount of at least one oxygen absorbent contained in an emulsion.

In another aspect, this invention provides a method of making an oxygen absorbing product by dispersing an effective amount of at least one oxygen absorbent in an emulsion, dispersion, or suspension to form an oxygen absorbing composition and transferring the oxygen absorbing composition onto a substrate.

In another aspect, this invention provides an oxygen absorbing product formed by the process of dispersing an effective amount of at least one oxygen absorbent in an emulsion, dispersion, or suspension to form an oxygen absorbing composition and transferring the oxygen absorbing composition onto a substrate. The oxygen absorbing composition is covered with a thin permeable coating layer or a permeable film.

It is to be understood that both the foregoing general description and the following detailed description are exemplary of the invention and are not intended to be exhaustive or restrictive.

BRIEF DESCRIPTION OF THE DRAWING

The invention is best understood from the following detailed description when read in connection with the accompanying drawing, in which.

DETAILED DESCRIPTION OF THE INVENTION

The present invention provides oxygen absorbing compositions having oxygen absorbents (or "reactants") dispersed in multiple-component carriers, such as emulsions, dispersions, or suspensions or other mixtures. By dispersing an oxygen absorbent in such a multi-component system, the resulting composition is more easily applied. In particular, emulsions can be easily applied by printing them directly onto a substrate. The oxygen absorbing compositions of the present invention, by virtue of the oxygen absorbent being contained in an emulsion, are capable of containing greater amounts of oxygen absorbent and have better oxygen permeability than known formulations having solids or solutions containing the reactants. In addition, use of emulsions allows inclusion of other components in the composition, such as hydrogels, that enable using the compositions in low humidity environments, as well as high humidity environments.

The emulsions of the present invention have a viscosity and total solids content sufficient to hold the reactants in a stable suspension, as well as a surface tension and viscosity that change when mixing or pumping in a thixotropic or pseudoplastic manner. These properties make the emulsion suitable for printing on, for example, a rotary screen, reverse roll, or gravure roll printer.

In addition, the emulsions of the present invention are chemically, biochemically, and physically compatible with the reactants, the web materials (upon which the compositions are applied), and the products being protected from the presence of oxygen. Compatibility with reactants means that the emulsion neither reacts with any of the reactants nor inhibits the reaction of the reactants with oxygen. Compatibility with web materials requires that the surface tension of the emulsion be low and the film-forming properties be such that a uniform layer can be deposited and maintained until it gels or dries. Compatibility with the products being protected requires that the emulsion be suitable for direct contact with food, pharmaceuticals, or other ingredients.

Oxygen absorbents which can be contained in the emulsions in the present invention include iron and glucose oxidase. A salt may be used as an electrolyte for oxidation of the iron. The iron may be hydrogen-reduced iron, electrolytically reduced iron, or chemically reduced iron (electrolytically reduced iron will provide greater reactivity). Although iron is preferred as the metallic oxygen absorbing agent, it will be appreciated that other metals may be used. These are, by way of example and not limitation, aluminum, copper, zinc, titanium, magnesium, and tin. These other metals do not, however, have the oxygen absorbing capacity of iron. Also, other elements which can be used in elemental or partially oxidized form are sodium, manganese, iodine, sulfur, and phosphorus. These elements are also not as effective as iron.

The electrolytic salt may be sodium chloride or any other suitable food compatible salt including, but not limited to, sodium sulfate, potassium chloride, ammonium chloride, ammonium sulfate, calcium chloride, sodium phosphate, calcium phosphate, and magnesium chloride. For non-food products, other non-food compatible salts can be used. Both the salt and the iron are preferably between 48 and 325 mesh.

The oxygen absorbing compositions of the present invention are intended for use in either low-moisture or high-moisture environments. Certain containers have a high moisture content. In such containers, the oxygen absorbing compositions of the present invention can contain a moisture absorbent such as silica gel or a molecular sieve to activate oxygen absorbing action and to absorb moisture from the container. Other containers, such as those storing fried foods (e.g., potato chips), have very low moisture content and the oxygen absorbing composition may contain a moisture carrying material such as a hydrogel, activated carbon, or other material to release the moisture necessary to activate the oxygen absorbing action.

Disclosed below are six exemplary emulsions that incorporate the specific requirements set forth above and are used to suspend oxygen absorbing reactants. Each of these emulsions has different functional properties and a slightly different intended application. First, an alginate gel emulsion system is disclosed as a carrier for the reactants and, optionally, a hydrogel or other moisture binding component.

Second, a xanthan gum emulsion system is disclosed. This emulsion may be used to suspend the reactants and to permit use of alcohol as part of the system. Alcohol is useful because it speeds drying. A hydrogel may also be used in this formulation.

Third, a microcrystalline cellulose emulsion system is disclosed. This emulsion may also contain water or alcohol or both. The system is compatible with both hydrogel and the reactants and, in addition, has a very low surface tension. The low surface tension allows clean separation of the composition on a printing substrate from the composition on, for example, the screen on a rotary screen printer during the short "break" required in high speed printing as the printer changes from one printing location to another. Further, microcrystalline cellulose has a thermogellation characteristic which lends stability to the printed film while drying. The system may also incorporate some xanthan gum in order to maintain pseudoplastic viscosity and flow characteristics.

Of the various emulsions, the microcrystalline cellulose formulation is most adapted to hold in stable suspension all of the various ingredients, such as iron, hydrogel, and salts. This formulation is also more salt tolerant than the other emulsions.

Finally, three commercially prepared adhesive emulsions are disclosed to suspend the oxygen absorbing reactants. These adhesive emulsions are an acrylic polymer in water emulsion, a polyvinyl acetate in water emulsion, and a vinyl acetate-ethylene copolymer in water emulsion.

The present invention will now be illustrated in greater detail by way of the following examples. It should be understood, however, that the scope of the present invention is not limited by these specific examples.

The oxygen absorption tests in the following examples were conducted in pint, quart, and two-quart size mason type canning jars. The compositions described in the examples were either hand-printed using a rotary screen or coated using a #24 gravure roller onto a substrate to form labels. The labels were then affixed to the inside of the jars which were then sealed, and the amount of oxygen absorbed by the label was measured. In all of the examples, with one exception, the jars also contained water on blotter paper affixed to the side of the jar to supply moisture for the reaction. The one exception was the example containing hydrogel, which itself supplies water so that no additional source of water was needed. In the tests where water on blotter paper was used, the printed or coated oxygen absorbing material was dried at 200 degrees F.

The oxygen that was absorbed by the labels having the various compositions thereon was determined by an oxygen analyzer, available from Illinois Instruments, which measured the oxygen level present in each jar while the label was in the jar. Where the testing vessel was flushed with carbon dioxide, the initial oxygen content was measured. The reduced amount of oxygen present in the jar was considered the amount absorbed by the label. In all of the examples, the amount of oxygen absorbed was satisfactory.

EXAMPLE 1

THE ALGINATE GEL EMULSION

To form the alginate gel emulsion, the following were combined in the given weight percentages.

| | |
|---|---|
| Sodium-alginate (low viscosity) | 2.25% |
| Polysorbate 80 | 1.00% |
| Sodium-propionate | 0.20% |
| Distilled water | 96.55% |

Preparation required a high shear mixer. In this example, a Kitchen Aid brand five-quart mixer was used. The ingredients were first dispersed within the water, then mixed at low speed for 15 minutes, then mixed at medium speed for 15 minutes. The mixing produced foam on the emulsion and entrained air within the emulsion. It required several hours (overnight in this example) after mixing for the foam to break and the entrained air to escape.

One part of the alginate emulsion described above was then combined with one part of 200 mesh electrolytically reduced iron containing two weight percent sodium chloride to form an oxygen absorbing composition. The formulation was printed onto a substrate to form labels. The printed oxygen absorbing composition was dried with heat, but enough moisture was left in the deposit so that an additional moisture source was not needed. The labels were then affixed to the inside of mason jars and their oxygen absorption rates were measured as follows (the variation among the three tests having equal print weight deposits is normal test variation):

| | Rate of Oxygen Absorption | | |
|---|---|---|---|
| Weight of print deposit per in$^2$ | #1 1.50 g | #2 1.50 g | #3 1.50 g |
| 16 hr | 13 cc $O_2$ | 14 cc $O_2$ | 20 cc $O_2$ |
| 24 hr | 16 cc $O_2$ | 14 cc $O_2$ | 22 cc $O_2$ |
| 47 hr | 26 cc $O_2$ | 22 cc $O_2$ | 34 cc $O_2$ |
| 135 hr | 54 cc $O_2$ | 41 cc $O_2$ | 62 cc $O_2$ |

Sodium alginate was used in the emulsion of this example (rather than propylene glycol alginate) because it is soluble and stable at neutral to slightly alkaline pH. The low viscosity version was used because it permits a higher concentration of the alginate within the emulsion without an excessively high viscosity. The product used in this example was brand name Keltrol KNLV, available from Merck & Company. Although the example described contained 2.25 weight percent sodium alginate, the weight percent of sodium alginate may be in the range of 0.2% to 10%, with a preferred range of 1.0% to 3.5%.

Polysorbate 80 was used in the emulsion of this example as a surfactant to reduce surface tension. Without a surfactant, the emulsion does not deposit cleanly or remain in a thin film. Because the medium was aqueous, a hydrophilic surfactant was required. Polysorbate 80, with a hydrophilic lipophilic balance of 14–15, is the most hydrophilic food grade surfactant available. The product used in this example was brand name Durfax 80 from Van den Berg Foods. Although the example described contained 1.0 weight percent Polysorbate 80, the weight percent of Polysorbate 80 may be in the range of 0.1% to 10%, with a preferred range of 0.5% to 1.5%.

Sodium propionate was used as a preservative in this emulsion because there were some metabolizable carbohydrates remaining in the alginate. Because there are virtually no simple sugars, yeast and bacteria are not the principal classes of spoilage organisms. Protection is needed against molds and fungi which can break down complex carbohydrates. Many of the likely candidates such as sorbates and benzoate derivatives either have limited solubility at neutral pH or are minimally effective in the salt form. The sodium propionate used in this example was an effective preservative.

A 1:1 ratio of iron to alginate gel was used in this example. This can be expanded to ratios above 2:1. The preferred weight percent range of iron within the alginate suspension is 50% to 60%, but can satisfactorily be in the range from 30% to 80%. The iron may contain, by weight, from 0.1% to 5.0% sodium chloride, with a preferred range of 1.5% to 2.5%.

A planetary mixer with a wire whip may be used to mix the ingredients of the emulsion in the water provided the alginate gel granules are first added to the water slowly so that each grain is wetted individually to avoid clumping. Once this is done, the Polysorbate 80 may be added. The sodium propionate may optionally be added before the gum so that it will easily dissolve.

In an alternative embodiment, hydrogel may be blended into the emulsion at levels up to 40 weight percent once it is ready for printing or coating. The preferred weight percent range for hydrogel is 8% to 18%. The amount of hydrogel added to the emulsion depends to a degree on the amount of iron in the emulsion. The less iron, the more hydrogel that can be added.

Two weight percent fine $CaCl_2$ may be added to the print dispersion to induce gelation of the alginate. It is believed that any compound containing calcium will also induce gelation.

As an alternative application method, the emulsion may first be printed or coated onto a substrate and the oxygen absorbing reactants may then be deposited thereon. After coating or printing by any method, if desired, a divalent metal ion such as fine powdered $CaCl_2$ may be deposited onto the emulsion to induce gelation of the alginate. $Ca(OH)_2$ may be a satisfactory alternative for this purpose.

The emulsion of this example is ready to use after the foam created by mixing breaks and the entrained air escapes. The emulsion remains stable for several weeks at room temperature, although the iron may react with the water in the emulsion with time. Increasing the pH in the emulsion may help prevent the reaction (this applies to all of the compositions herein).

EXAMPLE 2

THE XANTHAN GUM EMULSION

To form the xanthan gum emulsion, the following were combined in the given weight percents:

| | |
|---|---|
| Xanthan gum | 2.00% |
| Isopropyl alcohol | 43.00% |
| Tap water | 55.00% |

The xanthan gum is available as a single grade from Merck under the brand name Keltrol KT. The xanthan gum may be 0.1 to 5.0 weight percent of the emulsion, with a preferred range of 0.5% to 1.5%. The dispersion technique used was similar to that used with the alginate emulsion above because careful addition to water is necessary to prevent clumping.

The components were mixed in a planetary mixer. The xanthan gum was slowly added to the water alone. The addition took 5–10 minutes with the mixer on med-low speed. The result was a very heavy gum suspension. Immediately upon achieving a uniform dispersion, the alcohol was added very gradually. As this was done, the suspension thinned to a flowable translucent gel dispersion (which is then stable for several months). The isopropyl alcohol and water can be used in any ratio.

One part of the xanthan gum emulsion was combined with one part 200 mesh electrolytically reduced iron containing one weight percent sodium chloride. The formulation was printed onto a substrate in varying amounts to form labels. The printed oxygen absorbing composition was dried with heat, but enough moisture was left in the deposit so that an additional moisture source was not needed. The labels were then affixed to the inside of mason jars and their oxygen absorption rates were measured as follows:

| | Rate of Oxygen Absorption | | |
|---|---|---|---|
| | #1 | #2 | #3 |
| Weight of print deposit per in$^2$ | 2.64 g | 3.94 g | 3.05 g |
| 16 hr | 45 cc $O_2$ | 150 cc $O_2$ | 58 cc $O_2$ |
| 24 hr | 57 cc $O_2$ | 151 cc $O_2$ | 76 cc $O_2$ |
| 48 hr | 76 cc $O_2$ | 206 cc $O_2$ | 120 cc $O_2$ |
| 137 hr | 100 cc $O_2$ | 222 cc $O_2$ | 148 cc $O_2$ |

The xanthan gum emulsion can hold much more iron without settling out than the sodium alginate emulsion, because of the higher viscosity of the xanthan gum emulsion. Iron compositions of a weight percent range of 15% to 80% are possible, with a preferred range of 50% to 70%. The iron may contain 0.1% to 5.0% sodium chloride by weight, with a preferred range of 0.5% to 1.2%.

The xanthan gum emulsion is useful because it is possible to stabilize oxygen absorbing reaction components using both alcohol and water in the emulsion. It was not necessary in this formula to add either a surfactant or a preservative although one to two weight percent Polysorbate 80 may improve printability. Otherwise, the alcohol serves as both preservative and surfactant. The emulsion may be made without alcohol, however, in which case a surfactant and preservative should be used that serve the same function as described above with the alginate emulsion. Polysorbate 80 and Na-propionate, respectively, may be used as the surfactant and preservative.

When ready for printing or coating, up to 40 weight percent hydrogel may be also added to the xanthan gum emulsion. Tests of benchtop screen depositing indicate that it is possible to deposit up to 60 weight percent of 200 mesh iron suspended in the emulsion as well. The emulsion containing hydrogel is stable for several hours, while the emulsion containing 60% iron is stable for about an hour before it starts to settle out.

Because xanthan gum is generally not as salt tolerant, the xanthan gum emulsion must be made with less salt unless a more salt tolerant version of xanthan gum is used.

EXAMPLE 3

THE MICROCRYSTALLINE CELLULOSE EMULSION

The microcrystalline emulsion was formed of the following in weight percents:

| | |
|---|---|
| Microcrystalline cellulose | 1.80% |
| Xanthan gum | 0.20% |
| Ethanol (95%) | 44.00% |
| Water (distilled) | 54.00% |

The microcrystalline cellulose used was brand name Avicel RC-591. A planetary mixer with a wire whip was used to disperse the components. First, the water and alcohol were combined. Then, the microcrystalline cellulose was fully wetted by careful addition to the water/alcohol blend. The xanthan gum was then added to increase viscosity. It took several hours for the mixture to hydrate. After the initial blend was made and mixed for about 10 minutes, the blend was mixed for 2–3 minutes every 15 minutes over the next two hours. This blend was then stable for several weeks.

Two parts of the cellulose emulsion were combined with 3.5 parts of 200 mesh electrolytically reduced iron containing one weight percent sodium chloride and three weight percent sodium diacetate. Sodium diacetate is added to the formulation because iron preferentially removes oxygen from carbon dioxide rather than elemental oxygen in an atmosphere of oxygen and carbon dioxide without sodium diacetate. With sodium diacetate present, the iron reacts with the oxygen and not the carbon dioxide. Other acetates and acid salts known in the art may be used in place of sodium diacetate.

The formulation was then printed onto a substrate in varying amounts to form labels. The labels were affixed to the inside of mason jars, which were flushed with carbon dioxide to lower the oxygen content and simulate a gas flushed container, and oxygen absorption rates were measured as follows:

| | Rate of Oxygen Absorption | | |
|---|---|---|---|
| | #1 | #2 | #3 |
| Weight of print deposit per in$^2$ | 1.80 g | 1.29 g | 1.12 g |
| 17 hr | 19 cc $O_2$ | 9.9 cc $O_2$ | 13 cc $O_2$ |
| 25 hr | 20 cc $O_2$ | 12 cc $O_2$ | 14 cc $O_2$ |
| 49 hr | 35 cc $O_2$ | 25 cc $O_2$ | 30 cc $O_2$ |
| 137 hr | 137 cc $O_2$ | 82 cc $O_2$ | 64 cc $O_2$ |

Next, two parts of the cellulose emulsion described above was combined with one part of 200 mesh electrolytically reduced iron containing two weight percent sodium chloride and 0.6 parts hydrogel. The formulation was printed onto a substrate in varying amounts to form labels. The labels were then affixed to the inside of mason jars and their oxygen absorption rates were measured as follows:

| | Rate of Oxygen Absorption | | |
|---|---|---|---|
| | #1 | #2 | #3 |
| Weight of print deposit per in$^2$ | 3.53 g | 3.39 g | 3.60 g |
| 18 hr | 46 cc $O_2$ | 51 cc $O_2$ | 48 cc $O_2$ |
| 39 hr | 111 cc $O_2$ | 91 cc $O_2$ | 100 cc $O_2$ |
| 47 hr | 121 cc $O_2$ | 96 cc $O_2$ | 120 cc $O_2$ |
| 75 hr | 134 cc $O_2$ | 122 cc $O_2$ | 130 cc $O_2$ |
| 160 hr | 135 cc $O_2$ | 125 cc $O_2$ | 130 cc $O_2$ |

One part of the cellulose suspension described above was then combined with one part of 200 mesh electrolytically reduced iron containing two weight percent sodium chloride. The formulation was printed onto a substrate in varying amounts to form labels. The labels were then affixed to the inside of the mason jars and their oxygen absorption rates were measured as follows:

| | Rate of Oxygen Absorption | | |
|---|---|---|---|
| | #1 | #2 | #3 |
| Weight of print deposit per in$^2$ | 3.01 g | 2.46 g | 2.29 g |
| 23 hr | 47 cc $O_2$ | 87 cc $O_2$ | 96 cc $O_2$ |
| 44 hr | 74 cc $O_2$ | 173 cc $O_2$ | 195 cc $O_2$ |
| 52 hr | 83 cc $O_2$ | 200 cc $O_2$ | 214 cc $O_2$ |
| 75 hr | 118 cc $O_2$ | 271 cc $O_2$ | 275 cc $O_2$ |
| 159 hr | 126 cc $O_2$ | 345 cc $O_2$ | 339 cc $O_2$ |

The advantage of microcrystalline cellulose is that it is both alcohol tolerant and salt tolerant. Because alcohol was used in this emulsion, it was again not necessary to use a surfactant or a preservative. The alcohol serves both purposes.

The choice of alcohol used in this emulsion is limited by the food contact requirement of the formula as a whole. Much of the alcohol is lost in drying but there is also some remaining alcohol which could transfer to the product being protected. With certain products this may preclude the use of alcohol as a solvent. In such an instance, it would be necessary to add a surfactant and a preservative. Those used with the alginate formula would be satisfactory. A longer drying time would be required for such an emulsion.

The microcrystalline cellulose emulsion permits preparation of a particularly stable suspension of hydrogel or iron. A 40 weight percent hydrogel content in the emulsion will stay in suspension almost indefinitely. A 60 weight percent iron emulsion will stay suspended for several days. In addition, the viscosity and surface tension of the microcrystalline cellulose emulsion are such that rotary screen depositing is optimum at higher speeds.

The weight percent range of microcrystalline cellulose that can be used is 0.2% to 7.0%. The preferred range is 0.9% to 2.7%. The weight percent range of xanthan gum is 0.1% to 4.0%, with a preferred range of 0.1% to 0.5%. Any ratio of ethanol to water may be used. The weight percent range of iron that may be added to the microcrystalline cellulose emulsion is 10% to 80%, with a preferred range of 40% to 60%. The weight percent of sodium chloride in the iron may be from 0.1% to 5.0%, with a preferred range of 0.8% to 1.5%. The weight percent of sodium diacetate that may be used in the iron is 0.1% to 30%, with a preferred range of 2.0% to 5.0%. A hydrogel may be added to the microcrystalline emulsion in a weight percent range of 1% to 40%, with a preferred range of 8% to 18%.

The printed oxygen absorbing composition was dried with heat, but enough moisture was left in the deposit so that an additional moisture source was not needed. If the oxygen absorbing coating or print is dried to dryness, it needs a source of moisture to initiate the oxidation of the iron in order to cause absorption of oxygen. The moisture is usually supplied by the food product with which the oxygen absorber is packaged. With dry food, the oxygen absorber needs to supply its own moisture. This may be accomplished by not fully drying the coating. Hydrogel may also be added to the emulsion before coating but, even in this case, the coating would not be fully dried so that the coating may supply its own moisture.

Hydrogen may form while the oxygen absorbing material is stored because, in the absence of oxygen, the iron will react with the water to form iron oxides and hydrogen. To prevent this, the pH of the coating or emulsion should be increased to above 9.0 using a base. The preferred bases are hydroxides, such as sodium hydroxide or potassium hydroxide. Only compatible alkaline materials may be used.

In the above-described tests, with dried coatings, a two square inch piece of blotter paper saturated with water was placed in the mason jar as the moisture source. When water was left in the coating or a hydrogel was used, no water on blotter paper was used.

EXAMPLE 4

THE ACRYLIC POLYMER EMULSION

The acrylic in water emulsion used was Neocryl A-5117 brand from Zeneca Resins. A formulation comprising 50 weight percent of this acrylic emulsion and 50 weight percent iron blend containing 200 mesh electrolytically reduced iron containing 2 weight percent sodium chloride was printed on eight square inches of a polypropylene substrate and dried with heat. The print weight was 0.0135 g/in$^2$. The label was affixed to the inside of a mason jar along with two square inches of moisture saturated blotter paper. The oxygen absorption rate was as follows:

| | Rate of Oxygen Absorption | | | |
|---|---|---|---|---|
| | #1 | #2 | #3 | Average |
| 48 hours | 13 cc $O_2$ | 16 cc $O_2$ | 15 cc $O_2$ | 15 cc $O_2$ |
| 114 hours | 13 cc $O_2$ | 18 cc $O_2$ | 15 cc $O_2$ | 15 cc $O_2$ |

Next, 2.5 lbs. of the Neocryl A-5117 brand emulsion were combined with 6.88 lbs. iron (the iron was obtained from SCM Corporation and has the designation SCM A-220) with two weight percent NaCl and 40 g of water. This formulation, which had a viscosity of 2,700 centipoise, was coated onto a biaxially oriented polypropylene film using a #24 Gravure roller. A coat weight of the formulation of 0.0523 g/in$^2$ (containing 86.5 weight percent iron) was deposited for a total film weight of 0.0725 g/in$^2$.

The coated film was heated to dryness and two square inches of blotter paper saturated with water were put in the mason jar along with the oxygen absorbing film to act as a moisture source. This coated film absorbed 11.4 cc $O_2/in^2$ over 39–44 hours.

Next, 2.8 lbs. of the Neocryl A-5117 brand emulsion were combined with 5.0 lbs SCM A-220 iron with two weight percent NaCl and 34 g of Celagen brand (paratoluene sulfonyl hydrazide) blowing agent. The blowing agent produces very small bubbles inside the coating which increases the oxygen permeability of the coating. A coat weight of 0.0742 $g/in^2$ (80.6 weight percent iron) of this composition, which had a viscosity of 1,410 centipoise, was then coated onto a polypropylene film, as above, for a total film weight of 0.0943 $g/in^2$. This coated film absorbed 9.8 cc $O_2/in^2$ over 39–44 hours.

In the acrylic emulsion, the weight percent range of Neocryl A-5117 brand acrylic polymer may be 15% to 90%, with a preferred range of 25% to 35%. The iron used in the emulsion may be in a weight percent range of 10% to 85%, with a preferred range of 65% to 75%. The iron may be combined with a weight percent range of 0.1% to 5.0% sodium chloride, with a preferred range for the sodium chloride of 1.5% to 2.5%.

The ratio of acrylic emulsion to iron also depends on the acrylic emulsion used and the desired viscosity. Water is added to adjust the viscosity, which accordingly increases the iron content. These ranges would be different for other acrylic emulsions. Such is the case for all of the emulsions disclosed herein.

EXAMPLE 5

THE POLYVINYL ACETATE EMULSION

The polyvinyl acetate in water emulsion used was brand name Vinac XX-210 from Air Products. Forty-three weight percent of this polyvinyl acetate emulsion was combined with 57 weight percent iron blend containing 200 mesh electrolytically reduced iron containing two weight percent sodium chloride. This formulation was then printed on eight square inches of a polypropylene substrate with a print weight of 0.026 $g/in^2$. The resulting label was affixed to the inside of a mason jar and the oxygen absorption rate was measured as follows:

| | Rate of Oxygen Absorption | | | |
|---|---|---|---|---|
| | #1 | #2 | #3 | Average |
| 48 hours | 22 cc $O_2$ | 22 cc $O_2$ | 22 cc $O_2$ | 22 cc $O_2$ |
| 114 hours | 25 cc $O_2$ | 25 cc $O_2$ | 25 cc $O_2$ | 25 cc $O_2$ |

Next, 2.0 lbs. of the Vinac XX-210 brand emulsion were combined with 2.67 lbs. SCM A-220 iron and with two weight percent NaCl. This formulation was coated onto a biaxially oriented polypropylene film using a #24 gravure roller. A coat weight of the formulation of 0.034 $g/in^2$ (containing 70.8 weight percent iron) was deposited for a total film weight of 0.054 $g/in^2$. The coated film was completely dried with heat. When the samples were tested in a mason jar, blotter paper saturated with water was placed inside the mason jar to act as a moisture source. This coated film absorbed 4.6 cc $O_2/in^2$ over 39–44 hours.

The weight percent range for the Vinac XX-210 brand polyvinyl acetate may be 15% to 90%, with a preferred range of 40% to 50%. The iron may be added in a weight percent range of 10% to 85%, with a preferred range of 50% to 60%. The weight percent of sodium chloride in the iron may be from 0.1% to 5.0%, with a preferred range of 1.5% to 2.5%.

Water may be added to adjust the viscosity and thus increase the iron content. The ratio of iron to polyvinyl acetate emulsion may be different for other polyvinyl acetate emulsions.

EXAMPLE 6

THE VINYL ACETATE-ETHYLENE COPOLYMER EMULSION

The vinyl acetate-ethylene copolymer in water emulsion was Airflex 440 brand from Air Products. A formulation of 70 weight percent of this vinyl acetate-ethylene emulsion was combined with 30 weight percent iron blend containing 200 mesh electrolytically reduced iron containing two weight percent sodium chloride and printed on eight square inches of a polypropylene substrate at a print weight of 0.015 $g/in^2$. The resulting label was affixed to the inside of a mason jar, and the oxygen absorption rate was measured as follows:

| | Rate of Oxygen Absorption | | | |
|---|---|---|---|---|
| | #1 | #2 | #3 | Average |
| 48 hours | 11 cc $O_2$ | 10 cc $O_2$ | 8 cc $O_2$ | 10 cc $O_2$ |
| 114 hours | 12 cc $O_2$ | 10 cc $O_2$ | 10 cc $O_2$ | 11 cc $O_2$ |

The coated film was completely dried with heat. When the samples were tested in a mason jar, blotter paper saturated with water was placed inside the jar to act as a moisture source.

Next, another emulsion was prepared using Airflex 400 brand rather than Airflex 440 brand. In this example, 3.88 lbs of the Airflex 400 brand emulsion were combined with 5.25 lbs SCM A-220 iron with two weight percent NaCl and 300 g of water. This formulation, which had a viscosity of 4,550 centipoise, was coated onto a biaxially oriented polypropylene film using a #24 gravure roller. A coat weight of the formulation of 0.0423 $g/in^2$ (containing 71.1 weight percent iron) was deposited for a total film weight of 0.0625 $g/in^2$. The coated film was completely dried with heat. When the samples were tested in a mason jar, blotter paper saturated with water was placed inside the mason jar to act as a moisture source. This coated film absorbed 3.6 cc $O_2/in^2$ over 39–44 hours and 9.9 cc $O_2/in^2$ over 306–312 hours.

Next, 3.88 lbs. of the Airflex 400 brand emulsion were combined with 5.63 lbs SCM A-220 iron and with two weight percent NaCl and 150 g of water. A coat weight of 0.0447 $g/in^2$ (72.7 weight percent iron) of this composition, which had a viscosity of 2,000 centipoise, was then coated onto a polypropylene film, as above, for a total film weight of 0.0648 $g/in^2$. The coated film was completely dried with heat. When the samples were tested in a mason jar, blotter paper saturated with water was placed inside the mason jar to act as a moisture source. This coated film absorbed 3.3 cc $O_2/in^2$ over 39–44 hours and 11.3 cc $O_2/in^2$ over 306–312 hours.

The weight percent range of the Airflex 440 brand emulsion may be from 15% to 99% of the composition, with a preferred range of 65% to 75%. A weight percent range from 1.0% to 85% iron may be added to the composition, with a preferred range of 25% to 35%. A weight percent range from 0.1% to 5.0% sodium chloride may be used in the iron, with a preferred range of 1.5% to 2.5%.

Water may be added to adjust the viscosity and thus increase the iron content. The ratio of iron to the vinyl acetate-ethylene copolymer emulsion would be different for other vinyl acetate-ethylene copolymer emulsions.

The weight percent range of the Airflex 400 brand emulsion may be from 15% to 99% of the composition, with a preferred range of 35% to 50%. A weight percent from 1% to 85% iron may be added to the composition, with a preferred range of 50% to 65%. A weight percent range from 0.1% to 5% sodium chloride may be used in the iron, with a preferred range of 1.5% to 2.5%. Water can also be added to this emulsion to adjust the viscosity and thus increase iron content.

These suspensions can also be printed or coated onto a film and only partially heat dried so that no moisture source is needed. When this is done, these oxygen absorbing materials can be used in dry environments. When moisture is left in the oxygen absorber, the pH of the suspension must be raised to above 9.0 so that hydrogen will not be formed when the oxygen absorbers are stored.

Other experiments were also performed to show the efficacy of oxygen-absorbing emulsions having less than 10.0 weight percent of the oxygen absorbent contained in the emulsion.

EXAMPLE 7

A polypropylene film was coated with a composition of 50.0 grams of S.C. Johnson Jonbond 751 Acrylic emulsion and 2.6 grams of SCM A-131 325 mesh iron containing 1.0% sodium chloride. The final dry coating had an iron content of 8.6% and a coat weight of 0.05 grams per square inch. After 9 days, this coating absorbed 1.94 cc of oxygen per 5 square inches.

EXAMPLE 8

A polypropylene film was coated with a composition of 50.0 grams S.C. Johnson Jonbond 751 Acrylic emulsion and 1.2 grams of SCM A-131 325 mesh ion containing 1.0% sodium chloride. The final dry coating had an iron content of 4.2% and a coat weight of 0.04 grams per square inch after 6 days. After 9 days, this coating absorbed 1.94 cc of oxygen per 5 square inches.

EXAMPLE 9

A polypropylene film was coated with a composition of 50.0 grams Air Products & Chemical Airflex 400 vinyl acetate ethylene copolymer emulsion and 2.6 grams of SCM A-131 325 mesh iron containing 1.0% sodium chloride. The final dry coating had an iron content of 8.6% and a coat weight of 0.06 grams per square inch. This coating absorbed an average of 2.10 cc of oxygen per 5 square inches after 9 days.

EXAMPLE 10

A polypropylene film was coated with a composition of 50.0 grams Air Products & Chemical Airflex 400 vinyl acetate ethylene copolymer emulsion and 1.2 grams of SCM A-131 325 mesh iron containing 1.0% sodium chloride. The final dry coating had an iron content of 4.2% and a coat weight of 0.05 grams per square inch. This coating absorbed an average of 1.46 cc of oxygen per 5 five square inches after 6 days. After 9 days, this coating absorbed 3.07 cc of oxygen per 5 square inches.

EXAMPLE 11

A polypropylene film was coated with a composition of 50.0 grams Air Products & Chemical Airflex XX-210 vinyl acetate homopolymer emulsion and 2.6 grams of SCM A 1-131 325 mesh iron containing 1.0% sodium chloride. The final dry coating had an iron content of 8.6% and a coat weight of 0.05 grams per square inch. After 9 days, this coating absorbed an average of 0.81 cc of oxygen per 5 square inches.

EXAMPLE 12

A polypropylene film was coated with a composition of 50.0 grams Air Products & Chemical Airflex XX-210 vinyl acetate homopolymer emulsion and 1.2 grams of SCM A-131 325 mesh iron containing 1.0% sodium chloride. The final dry coating had an iron content of 4.2% and a coat weight of 0.07 grams per square inch. This variable absorbed an average of 0.97 cc oxygen per 5 square inches after 6 days. After 9 days, this coating absorbed 2.43 cc of oxygen per 5 square inches.

Figure 1:
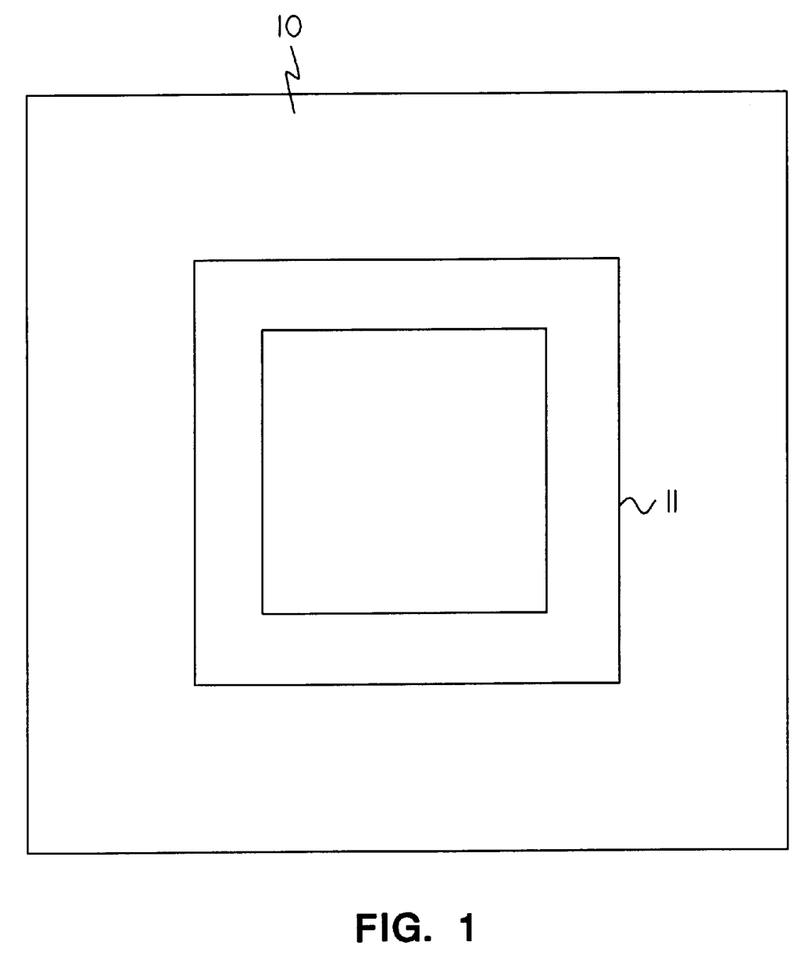
FIG. 1 is a top view of an exemplary embodiment of the present invention.

FIG. 1 shows an exemplary embodiment of the present invention with an oxygen absorbing composition used in a label 11 that is adapted to be attached to the inside of a food container. In FIG. 1, label 11 is shown secured to web 10, which is fabricated of release paper so that label 11 may be removed therefrom. A plurality of labels 11 may be adhered to web 10.

Figure 2:
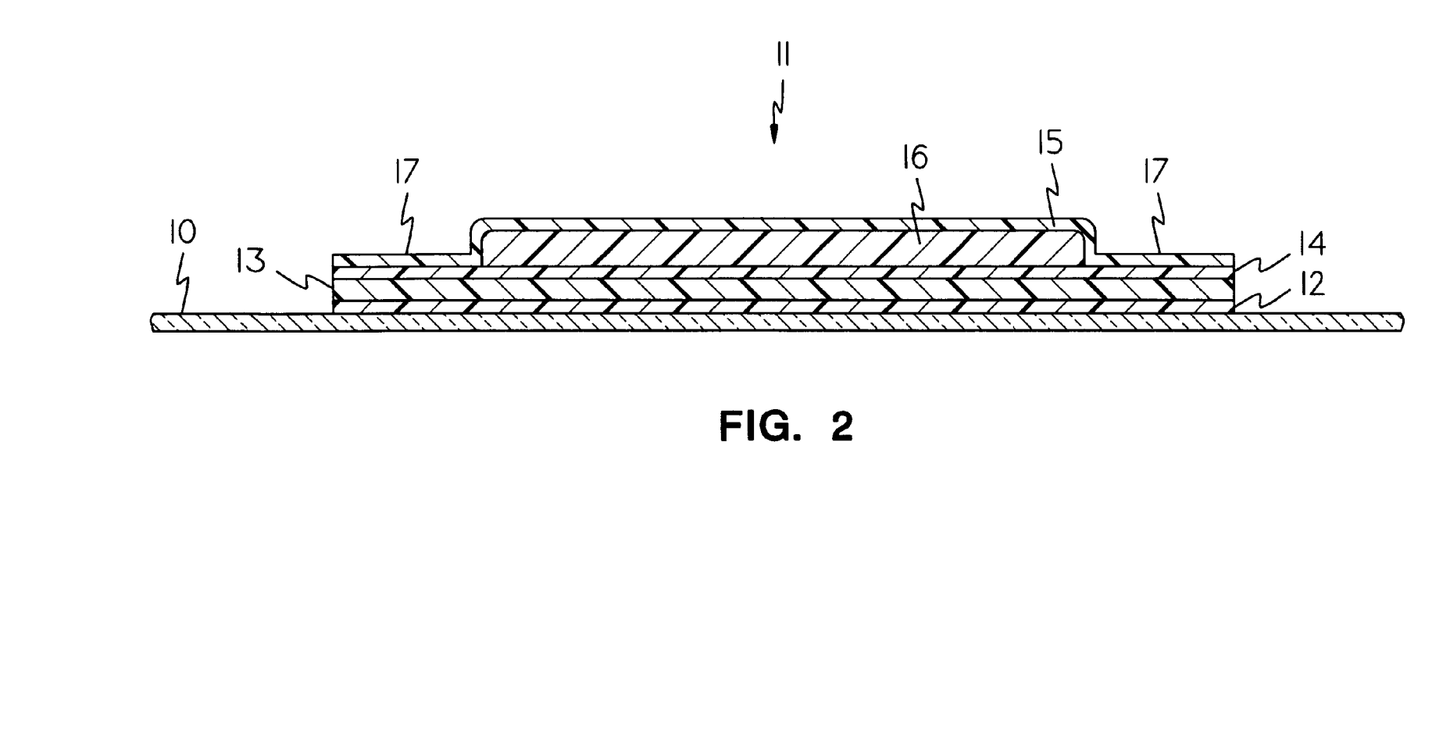
FIG. 2 is a cross-sectional view of the exemplary embodiment of FIG. 1.

FIG. 2 is a side cross sectional view of the label and web arrangement shown in FIG. 1. This exemplary embodiment shows label 11 attached to web 10 by an adhesive layer 12, which may be any suitable pressure-sensitive adhesive. Adhesive layer 12 forms the underside of base sheet 13 of label 11. Base sheet 13 may be made of suitable paper or flexible plastic film 1 to 5 millimeters in thickness. Flexible base sheet 13 may be moisture or vapor impervious, or it may be moisture-absorbent, if moisture will not deteriorate it. Layer 12 may alternatively be a hot melt adhesive or heat-sealable polymer. In such a case, adhesive layer 12 is releasably secured to web 10 by any suitable means, such as an additional layer or spots of suitable adhesive.

It is to be understood that the adhesive attachment of label 11 to web 10 is by way of example only. The plurality of labels may alternatively be attached to one another at their borders, in which case the labels may be separated using suitable cutting machinery or they may be torn from one another along perforations between them.

A second adhesive layer 14 is disposed on base sheet 13 on a side opposite adhesive layer 12. Second adhesive layer 14 may be of the same material and thickness as adhesive layer 12.

Oxygen absorbing composition 16 is disposed over second adhesive layer 14. Oxygen absorbing composition 16 may have the make-up of any of the oxygen absorbing compositions described above. It may be applied over second adhesive layer 14 by, for example, a rotary screen printer.

A cover layer 15 is disposed over oxygen absorbing composition 16. Cover layer 15 may be applied by printing or other known techniques. In the illustrated embodiment, cover layer 15 is secured over oxygen absorbing composition 16 by adhering both to oxygen absorbing composition 16 itself and to the periphery 17 of label 11, where it is secured to base sheet 13 by second adhesive layer 14. It is to be noted that in alternative embodiments the adhesion between cover layer 15 and oxygen absorbing composition 16 may be sufficient such that no peripheral attachment is needed.

Cover layer 15 is a permeable but not porous polymer coating on top of oxygen absorbing composition 16. Cover layer 15 is a single layer that forms a film over oxygen absorbing composition 16. Oxygen absorbing composition 16 is an extremely flexible film that conforms to the shape of the containers of many different food products with which it may be used. Cover layer 15 must be flexible enough to remain adhered to oxygen absorbing composition 16 regardless of the shape assumed by oxygen absorbing composition 16. Cover layer 15 is a thin coating layer that adheres to the smooth continuous film formed by oxygen absorbing composition 16. There is no need for an intermediate adhesive layer between oxygen absorbing composition 16 and cover layer 15, nor does oxygen composition 16 need to be hermetically sealed in this embodiment.

Cover layer 15 is made of a polymer dispersed in a water. No organic solvent is used to disperse the polymer. Water dispersed coatings can meet FDA standards for food contact, whereas solvent-containing coatings cannot. Organic solvents cannot be used when an intended use for the composition is to absorb oxygen in food containers. Polymer dispersions in water are acceptable for food contact. The solids content of the polymer in the water dispersion is in the range of 60–100%.

Various exemplary polymers useful as cover layer 15 were tested over oxygen absorbing compositions. The results of those tests are shown below in Table I. In these examples, an oxygen absorbing composition consisting of 25% acrylic resin and 75% 325 mesh iron powder blended with 2% sodium chloride was first coated onto a polyester film and then dried. The coating was done with a gravure cylinder and the finished dry coat weight was 30.8–36.9 lbs. per ream. Each of the various top cover polymers listed in Table I were then applied over the oxygen absorbing composition using a 0.3 draw down bar to obtain a 0.3 ml coating. For each coating composition, a 5 square inch sample was placed in a sealed vessel at 100% relative humidity and room temperature. Samples were taken with a syringe to measure the oxygen content in the sealed vessel in order to determine the rate of oxygen absorption by each of the samples. The results reported in Table I are the average of three tests for each sample. All of the samples adhered well to the oxygen absorbing composition.

TABLE I

RATE OF OXYGEN ABSORPTION OF SAMPLES
WITH VARIOUS COVER LAYERS
(cc of oxygen per square inch)

|  | SOLIDS CONTENT | After 3 Days | After 6 Days | After 10 Days | After 13 Days |
| --- | --- | --- | --- | --- | --- |
| Standard (no cover layer) |  | 9.6 | 11.3 | 12.4 | 13.5 |
| Tyvek (film layer) |  | 8.2 | 11.5 | 13.5 | 14.7 |
| Cellulose Acetate (film layer) |  | 8.8 | 10.0 | 10.9 | 12.1 |
| Airflex 400 (Vinyl Acetate Ethylene Copolymer) | 55.0% | 4.8 | 5.4 | 9.3 | 11.0 |
| Pierce & Stevens Latiseal A-7734A (Ethylene Vinyl Acetate) | 44.0% | 4.9 | 7.8 | 10.5 | 10.7 |
| Airflex 300 (Vinyl Acetate) | 55.0% | 5.9 | 6.9 | 9.1 | 10.1 |
| Vinac XX-210 (Vinyl Acetate Homopolymer) | 55.0% | 3.7 | 5.1 | 8.1 | 9.3 |
| Airflex 421 (Acetate Ethylene Copolymer) | 52.0% | 4.2 | 5.5 | 7.7 | 8.7 |
| Vycar 526 (Plasticized Vinyl Chloride Polymer) | 57.5% | 2.7 | 3.6 | 5.3 | 6.8 |
| Jonbond 751 (Acrylic Emulsion) | 56.0% | 2.3 | 4.2 | 6.1 | 6.7 |
| Allied Signal 316 (Oxidized Polyethylene Homopolymer) | 30.0% | 3.2 | 4.4 | 5.7 | 6.3 |
| Witco W232 (Aqueous Polyurethane Dispersion) | 29.8% | 1.9 | 3.4 | 5.6 | 6.2 |

The amount of oxygen that was absorbed by the oxygen absorbing composition in each of the samples reported in Table I is dependent upon the permeability of the cover layer. Tyvek showed the greatest permeability of the samples that are reported, with progressively decreasing permeability to the Witco W232 (Aqueous Polyurethane Dispersion) at the bottom of Table I. Other water soluble polymers known in the art may also be used in accordance with the present invention as cover layer 15.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An oxygen-absorbing product comprising (a) an oxygen absorbent contained in an emulsion, wherein said oxygen absorbent is a mixture of at least 1 weight percent of a metal, and a salt wherein said salt is at a concentration range of between 0.1 to 5.0 weight percent of said metal; and (b) a thin film cover layer permeable to oxygen disposed over said emulsion, wherein said thin film is a polymer selected from the group consisting of cellulose acetate polymer, vinyl acetate ethylene copolymer, vinyl acetate homopolymer, acetate ethylene copolymer, plasticized vinyl chloride polymer, acrylic polymer and oxidized polyethylene homopolymer.

2. The product of claim 1 wherein said thin film cover layer is adhesive.

3. The product of claim 1 wherein said thin film cover layer is dispersed in water in the absence of an organic solvent.

* * * * *